United States Patent [19]
Kumar

[11] Patent Number: 6,032,410
[45] Date of Patent: *Mar. 7, 2000

[54] SOD OR OTHER VEGETATION

[75] Inventor: Vijayendra Kumar, New Castle, Del.

[73] Assignee: E. I. du Pont de Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,480

[22] Filed: Jan. 28, 1997

[51] Int. Cl.[7] .................................................. A01C 1/04
[52] U.S. Cl. ........................................................ 47/56
[58] Field of Search ...................................... 47/56

[56] References Cited

U.S. PATENT DOCUMENTS

| | | | |
|---|---|---|---|
| 3,334,556 | 8/1967 | Owen | 94/7 |
| 3,848,359 | 11/1974 | Seith et al. | 47/56 |
| 3,863,388 | 2/1975 | Loads | 47/56 |
| 4,023,506 | 5/1977 | Robey | 111/1 |
| 4,066,490 | 1/1978 | Yoshimi | 156/276 |
| 4,357,780 | 11/1982 | Ball | 47/56 |
| 4,720,935 | 1/1988 | Rogers et al. | 47/56 |
| 4,786,550 | 11/1988 | McFarland et al. | 428/203 |
| 4,790,691 | 12/1988 | Freed | 405/263 |
| 4,819,933 | 4/1989 | Armond | 272/3 |
| 4,867,614 | 9/1989 | Freed | 405/263 |
| 4,900,010 | 2/1990 | Wengmann et al. | 272/3 |
| 4,916,855 | 4/1990 | Halliday et al. | 47/58 |
| 5,014,462 | 5/1991 | Malmgren et al. | 47/1.01 |
| 5,120,344 | 6/1992 | Libor et al. | 71/27 |
| 5,177,898 | 1/1993 | Decker | 47/56 |
| 5,189,833 | 3/1993 | Clark | 47/56 |
| 5,209,768 | 5/1993 | Hughes | 504/313 |
| 5,224,290 | 7/1993 | Molnar et al. | 47/56 |
| 5,224,292 | 7/1993 | Anton | 47/64 |
| 5,326,192 | 7/1994 | Freed | 405/258 |
| 5,346,514 | 9/1994 | Molnar et al. | 47/58 |
| 5,397,368 | 3/1995 | Molnar et al. | 47/58 |
| 5,404,671 | 4/1995 | Farrow, Jr. et al. | 47/1.01 |
| 5,507,845 | 4/1996 | Molnar et al. | 47/1.01 |
| 5,555,674 | 9/1996 | Molnar et al. | 47/56 |

FOREIGN PATENT DOCUMENTS

| | | | |
|---|---|---|---|
| 0 204 381 | 12/1986 | European Pat. Off. | E01C 13/00 |
| 2 613 391 | 10/1988 | France | E01C 13/00 |
| 2-128622 | 5/1990 | Japan | A01G 1/00 |
| 1202525 | 1/1986 | U.S.S.R. | A01G 7/06 |
| WO 95/19101 | 7/1954 | WIPO | A01G 1/12 |
| WO 94/09613 | 5/1994 | WIPO | A01G 1/12 |

*Primary Examiner*—Edward A. Miller

[57] ABSTRACT

A sod comprising a root support matrix that itself comprises a mixture of soil and/or sand, and shredded carpet fragments, wherein the shredded carpet fragments are from about one-tenth percent (0.1%) to about five percent (5.0%) by weight of the matrix; and a plurality of plants growing in said root support matrix, said plants having roots entangled with said shredded carpet fragments. The shredded carpet fragments comprise a mass of entangled face yarns some of which yarns have bits of carpet backing material attached thereto, wherein at least about ninety percent (90%), and more preferably at least about ninety-five percent (95%), of the bits of carpet backing material have no one dimension greater than about one-quarter (0.25) inch.

6 Claims, 2 Drawing Sheets

SOD OR OTHER VEGETATION

FIELD OF THE INVENTION

This invention relates generally to the production of sod or other vegetation and, more particularly, relates to a sod or other vegetation produced using recycled waste carpet in the form of shredded carpet fragments.

BACKGROUND OF THE INVENTION

U.S. Pat. No. 5,404,671 (Farrow, Kumar and Mitchell), assigned to the assignee of the present invention, discloses a method for producing sod and the sod resulting therefrom which utilizes a root support matrix comprised of shredded, recycled carpet pieces and compost.

SUMMARY OF THE INVENTION

The present invention is directed to a turfgrass sod in a root support matrix comprising a mixture of soil and/or sand and shredded carpet fragments, and a plurality of plants growing in said root support matrix, said plants having roots entangled with said shredded carpet fragments. The shredded carpet fragments are from about one-tenth percent (0.1%) to about five percent (5.0%) by weight of the matrix, and more prefereably from about three-tenths percent (0.3%) to about three percent (3.0%) by weight of the root support matrix. The root support matrix may optionally include compost, wherein the relative percentage of compost to the matrix is not more than fifteen percent (15%) by weight.

The shredded carpet fragments comprise a mass of entangled face yarns some of which yarns have bits of carpet backing material attached thereto, wherein at least about ninety percent (90%), and more preferably at least about ninety-five percent (95%), of the bits of carpet backing material that are attached to a face yarn have no one dimension greater than about one-quarter (0.25) inch.

BRIEF DESCRIPTION OF THE DRAWING

The invention will be more fully understood from the following detailed description, taken in connection with the accompanying drawing, in which.

DETAILED DESCRIPTION OF THE INVENTION

Figure 1:
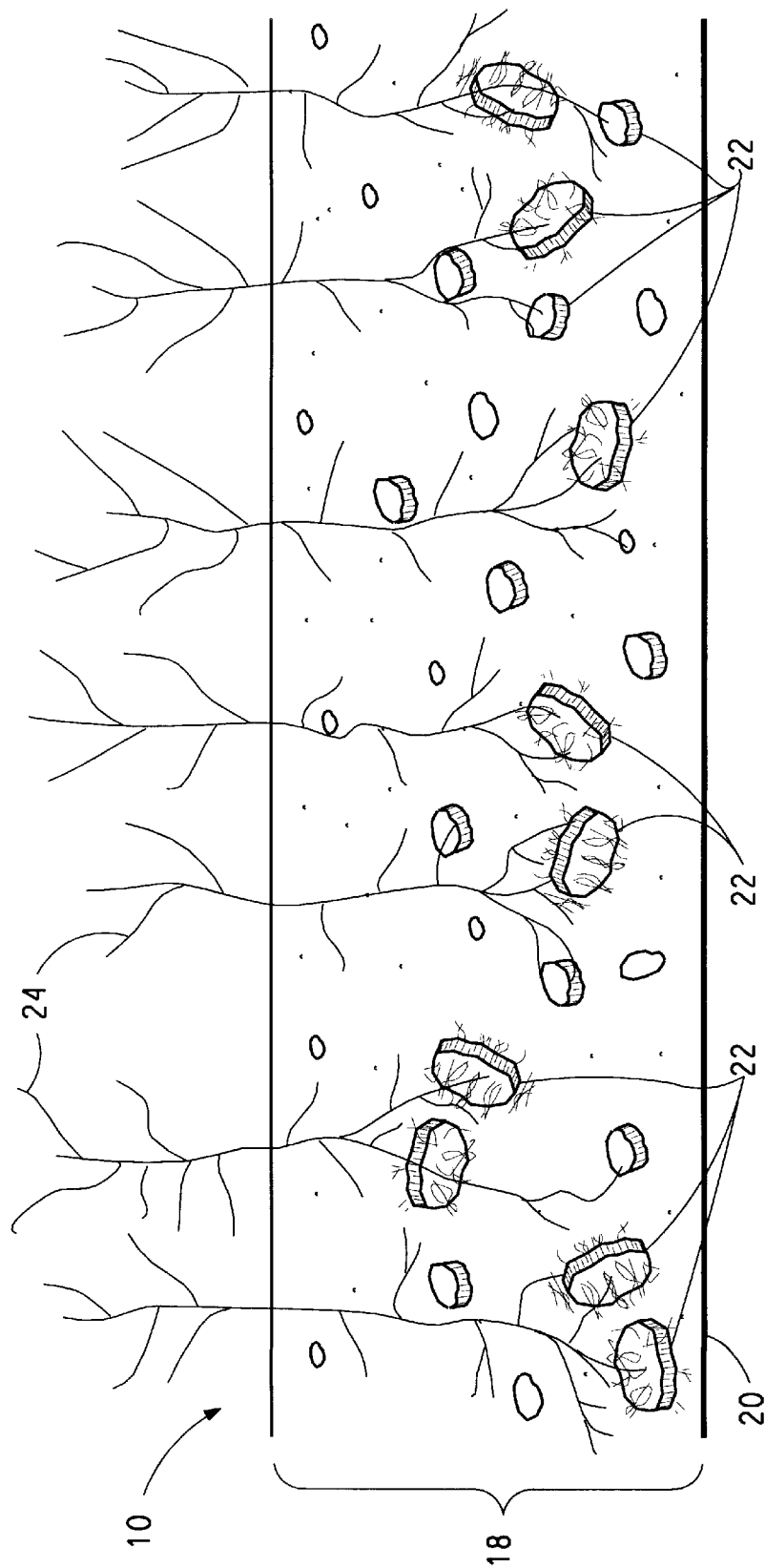
FIG. 1 is a side-elevational view taken in cross-section of a module of sod embodying the present invention.

Throughout the following detailed description, similar reference numerals refer to similar elements in all Figures of the drawings. Illustrated in FIG. 1 in a side elevational view is a volume of turfgrass sod generally indicated by the reference character 10 in accordance with the present invention. The sod 10 is shown in situ, in its growing location, prior to harvesting. Sod in accordance with the present invention is believed to exhibit a combination of properties that, as discussed hereafter, render it particularly useful as a playing surface for various outdoor athletic events.

The sod 10 comprises a plurality of viable plants, generally indicated by the reference character 24, growing in a root support matrix generally indicated by the reference character 18. The sod 10 is illustrated as being supported upon a substrate 20. The substrate 20 may be root impervious (such as a slab of concrete or a sheet of plastic film) or a degradable fabric (such as jute). The substrate 20 assists in transporting the sod to its location of intended use. Of course, sod 10 in accordance with the present invention may be grown in a prepared bed formed in the earth. A subsurface foundation, such as of choker-type natural separation filter over a porous aggregates base, may be laid beneath the bed, if desired.

ROOT SUPPORT MATRIX

Generally speaking the root support matrix 18 comprises a growing medium (i.e., a mixture of soil and/or sand, and, optionally, compost) mixed with shredded carpet fragments 22 (as defined herein). In accordance with this invention the shredded carpet fragments comprise from about one-tenth percent (0.1%) to about five percent (5.0%) by weight of the matrix, and more preferably, from about three-tenths percent (0.3%) to about three percent (3.0%) by weight of the root support matrix. As illustrated, in a mature sod 10 the root portion of the plants 24 are entangled with the shredded carpet fragments 22.

Growing Medium

As a general proposition the materials that comprise the growing medium (i.e., the soil and/or sand and, optionally compost) and their relative proportions depend on the locality in which the sod 10 is being used and the particular combination of properties that the sod 10 is desired to exhibit.

Soil

The soil used in the growing medium for a sod to be used in any given locality may be formed from any clay, loam or silt that is native or exotic to a given locality.

Sand

If used within the growing medium for a given locality the sand should be selected on the basis of its coarseness, which facilitates field drainage. Preferably, about ninety percent (90%) of the sand particles should have a diameter between 0.25 and 0.75 millimeters.

The relative proportion of the sand to soil will depend upon the particular circumstances of any given installation. It should be understood that the growing medium may be all soil, all sand, or some combination therebetween (and other materials as described below).

Other Materials

The present invention also contemplates the addition of a soil conditioner and/or compost to the growing medium portion of the root support matrix. The soil conditioner, such as diatomaceous earth, should comprise no more than about thirty percent (30%) of the total weight of the growing medium.

By "compost" it is meant any naturally occuring or manufactured organic matter (including peat or mulch) that is added as a separate constituent to the growing medium. Compost, if used, is used in a minor amount, that is, an amount less than about fifteen percent (15%) of the weight of the growing medium. When computing the relative percentage of "compost" within the growing medium, other organic matter (such as worms, insects, weeds etc.) that naturally occur in the constitutient materials in the growing medium are not included.

An example a lightweight transportable sod would comprise about fifty percent (50%) sand, about ten percent (10%) native soil, about ten percent (10%) compost and about thirty percent (30%) soil conditioners.

Shredded Carpet Fragments

The shredded carpet fragments that form a part of the root support matrix 18 are generally produced by reclamation of used residential and commercial carpets. In fact, the diversion of materials hitherto seen as waste material (i.e., used carpet) to a productive end is believed to be one of the primary advantages of the present invention. However, the use of newly manufactured carpet to form the shredded carpet fragments used in the present invention should not be excluded. Any type of carpet including, but not limited to, shag, cut pile and loop pile may be converted into carpet fragments useful in the present invention.

As is well known, traditional residential and commercial carpet comprises an array of face yarns that are tufted through a primary backing. The face yarns are typically formed of synthetic materials (such as nylon, polypropylene, and polyester) or natural materials (such as wool). Primary backing is usually formed of polypropylene, polyester, jute or nylon. A secondary backing, also typically formed of the same materials, is adhered (usually by a latex adhesive) over the tufts exposed on the undersurface of the primary backing.

Figure 2:
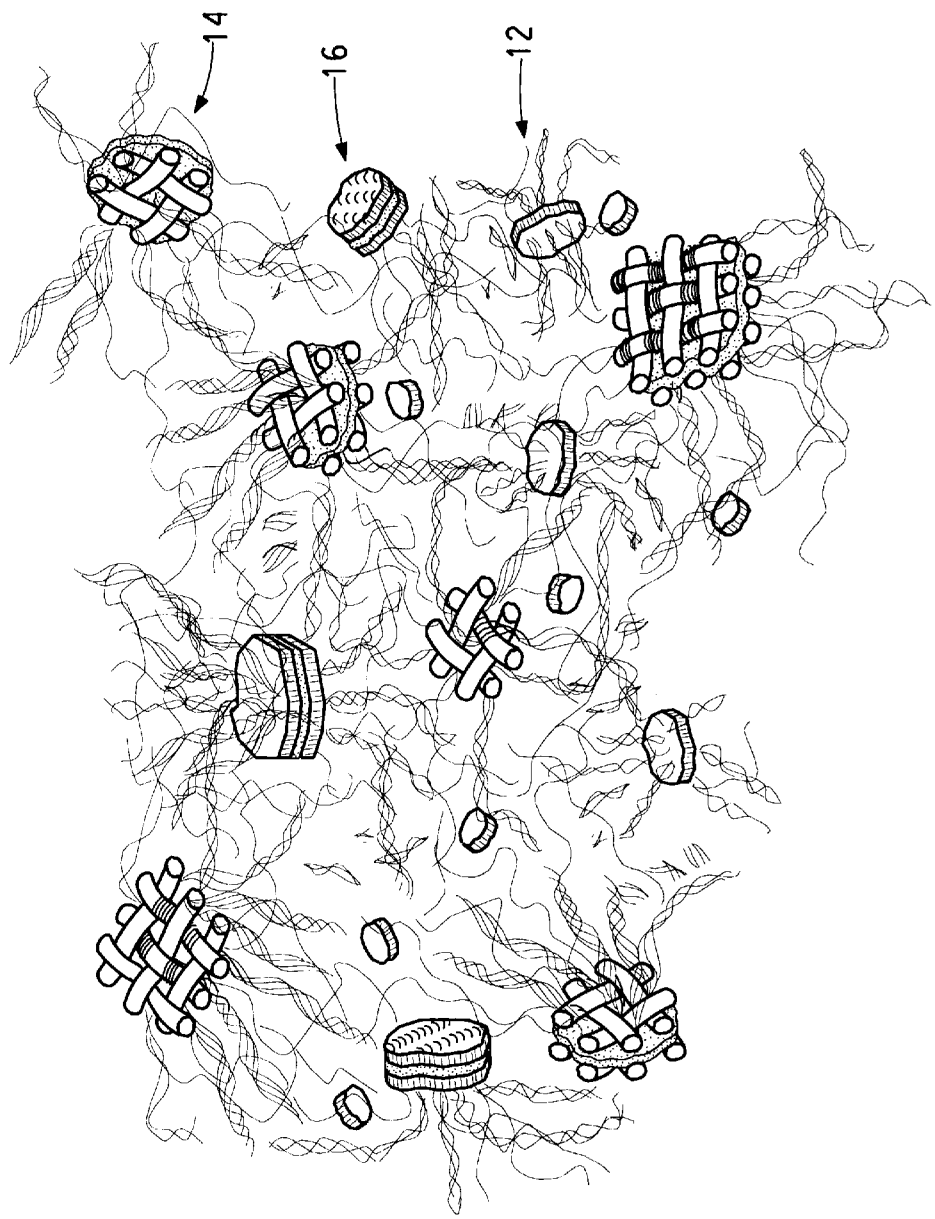
FIG. 2 is a highly stylized pictorial representation of a mass of shredded carpet fragments that form a part of the root support matrix of the present invention.

"Shredded carpet fragments" as used in this application are formed by shredding, cutting, grinding or othewise pulverizing carpet to such an extent that it forms a mass of entangled face yarns. FIG. 2 is a highly stylized pictorial representation of a mass of shredded carpet fragments that form a part of the root support matrix of the present invention.

As may be observed from that Figure, individual ones of the entangled face yarns may or may not have bits of carpet backing material attached. The term "carpet backing material" as used herein includes bits of either primary backing, secondary backing, or latex adhesive, and combinations of two or more of the same. Reference character 12 is intended to denote an instance in which face yarns have a bit of the primary backing still attached thereto. Reference character 14 denotes an instance in which the face yarn is attached to the primary backing and the latex adhesive. Reference character 16 shows face yarn attached to a still-intact piece of carpet backing included primary backing, latex adhesive and secondary backing.

The reference character 17 is intended to denote an instance in which a face yarn has no backing material attached thereto is included within the mass of shredded carpet fragments. Similarly, the reference character 19 is intended to denote an instance in which an isolated strand of primary backing with no backing material attached thereto is included within the mass of shredded carpet fragments.

"Shredded carpet fragments" as used in this application are pulverized to an extent such that at least about ninety percent (90%), and more preferably at least about ninety-five (95%) percent, of the bits of carpet backing material that may remain attached to an individual face yarn have no one dimension greater than about one-quarter (0.25) inch. The face yarns should, preferably, have a length in the range from about one (1) inch to about six (6) inches.

The shredded carpet "fragments" used in the present application should be distinguished from the shredded carpet "pieces" that are used in the above-referenced Farrow et al. patent. The shredded carpet "pieces" used in the context of the Farrow et al. patent denote sections of carpet backing material (mainly primary backing) having dimensions from about one-half (0.5) inch to about one (1) inch in width and from one (1) inch to about five (5) inches in length and include attached face yarns.

MIXING AND FORMULATING

Whatever the identity of the particular constitutients of the growing medium and whatever may be their relative proportion to each other, those constitutients and an appropriate amount of shredded carpet fragments are mixed to form a growing medium of a uniform consistency.

The shredded carpet fragments are mixed with the growing medium as follows. The growing medium is poured into a rotary mixer, such as a cement mixer. Wet shredded carpet fragments are next added to the rotating mixer with water being added to insure uniform mixing of the shredded carpet fragments with the growing medium. The shredded carpet fragments should be wet prior to introduction into the rotary mixer because, if not pre-wet the shredded carpet fragments tend not to mix.

PLANTS

Although the primary vegetation grown using the present invention is turfgrass sod, it should be understood that this invention is not to be construed as limited thereto. Other plants, such as flowers or vegetables, may be substituted for turfgrass. The vegetation is usually started using viable seeds, seedlings, sprigs, washed sod, root divisions, or plant plugs. (Washed sod is a grass cover held together by a root matrix alone, produced by growing grass in sand and washing away the sand.)

METHOD

Turfgrass sod or other vegetation may be grown in accordance with the present invention. The root support matrix 18, as described above, is prepared. The root support matrix 18 is extruded through an apparatus capable of continuously producing a uniform thickness of extrudate [e.g., from about two (2) to about four (4) inches]. The matrix 18 may be placed on a substrate 20 or directly into a bed, as desired. Into the root support matrix 18 is placed any desired species of vegetation in the form of viable seeds, seedlings, seedlings, sprigs, washed sod, root divisions, or plant plugs. Seeds or sprigs may be sprinkled uniformly on the extrudate layer. Alternatively, washed sod may be rolled on top of the extrudate layer.

The vegetation is appropriately watered, fertilized, etc. to establish root growth. The plants' roots penetrate into and entangle with the face yarns of the shredded carpet fragments as the plants grow. Vegetation should be mowed regularly to an acceptable height for the species and climate.

After a period of time (depending on plant species and growing conditions) the vegetation is ready for harvest, using an apparatus such as a rotary saw. In the case of turfgrass sod harvesting is accomplished by cutting the matrix having the mature turfgrass sod into squares or rectangular blocks, known as "modules". The sod could also be cut and formed into rolls. When harvested the sod is relocated to the location of intended use. of course, if the sod is grown at its location of intended use, the harvesting step is omitted.

Sod produced in accordance with the present invention exhits good drainage with minimal water holding capacity for early growth. The sod has high integrity, that is, a high resistance to tearing. The dense root matrix of the sod is anchored about the shredded carpet fragments to impart a high resistance to divoting. The sod is compaction-resistant, which imparts superior resiliency.

What is claimed is:

1. Sod comprising:
   (a) a root support matrix comprising: a mixture of (1) soil and/or sand and (2) shredded carpet fragments, wherein the shredded carpet fragments are from about one-tenth percent (0.1%) to about five percent (5.0%) by weight of the matrix, and wherein the shredded carpet fragments comprise a mass of entangled face yarns some of which yarns have bits of carpet backing material attached thereto, at least about ninety percent (90%) of the bits of carpet backing material that are attached to a face yarn have no one dimension greater than about one-quarter (0.25) inch; and (b) a plurality of plants growing in said root support matrix, said plants having roots entangled with said shredded carpet fragments.

2. The sod of claim 1 wherein the shredded carpet fragments are from about three-tenths percent (0.3%) to about three percent (3.0%) by weight of the root support matrix.

3. The sod of claim 1 wherein at least about ninety-five percent (95%) of the bits of carpet backing material that are attached to a face yarn have no one dimension greater than about one-quarter (0.25) inch.

4. The sod of claim 1 wherein a root support matrix further comprises compost, wherein the compost is not more than about fifteen percent (15%) by weight of the matrix.

5. A method for producing vegetation comprising the steps of:

a) placing viable seeds, seedlings, rooted cuttings, root divisions, or plant plugs into a root support matrix that comprises a mixture of (1) soil and/or sand, and (2) shredded carpet fragments, wherein the shredded carpet fragments are from about one-tenth percent (0.1%) to about five percent (5.0%) by weight of the matrix, and wherein the shredded carpet fragments comprise a mass of entangled face yarns some of which yarns have bits of carpet backing material attached thereto, at least about ninety percent (90%) of the bits of carpet backing material that are attached to a face yarn have no one dimension greater than about one-quarter (0.25) inch;

b) watering said seeds, seedlings, rooted cuttings, root divisions, or plant plugs to establish root penetration into said root support matrix and root entanglement with said carpet fragments to form mature vegetation.

6. Sod comprising:

(a) a root support matrix comprising: a mixture of (1) soil and/or sand and (2) shredded carpet fragments, wherein the shredded carpet fragments are from about one-tenth percent (0.1%) to about five percent (5.0%) by weight of the matrix and wherein the shredded carpet fragments comprise a mass of entangled face yarns some of which yarns have bits of carpet backing material attached thereto; and (b) a plurality of plants growing in said root support matrix, said plants having roots entangled with said shredded carpet fragments, the sod, due to the presence of the shredded carpet fragments therein, has a high resistance to tearing, divoting and compaction.

* * * * *